United States Patent Office 3,213,692
Patented Oct. 26, 1965

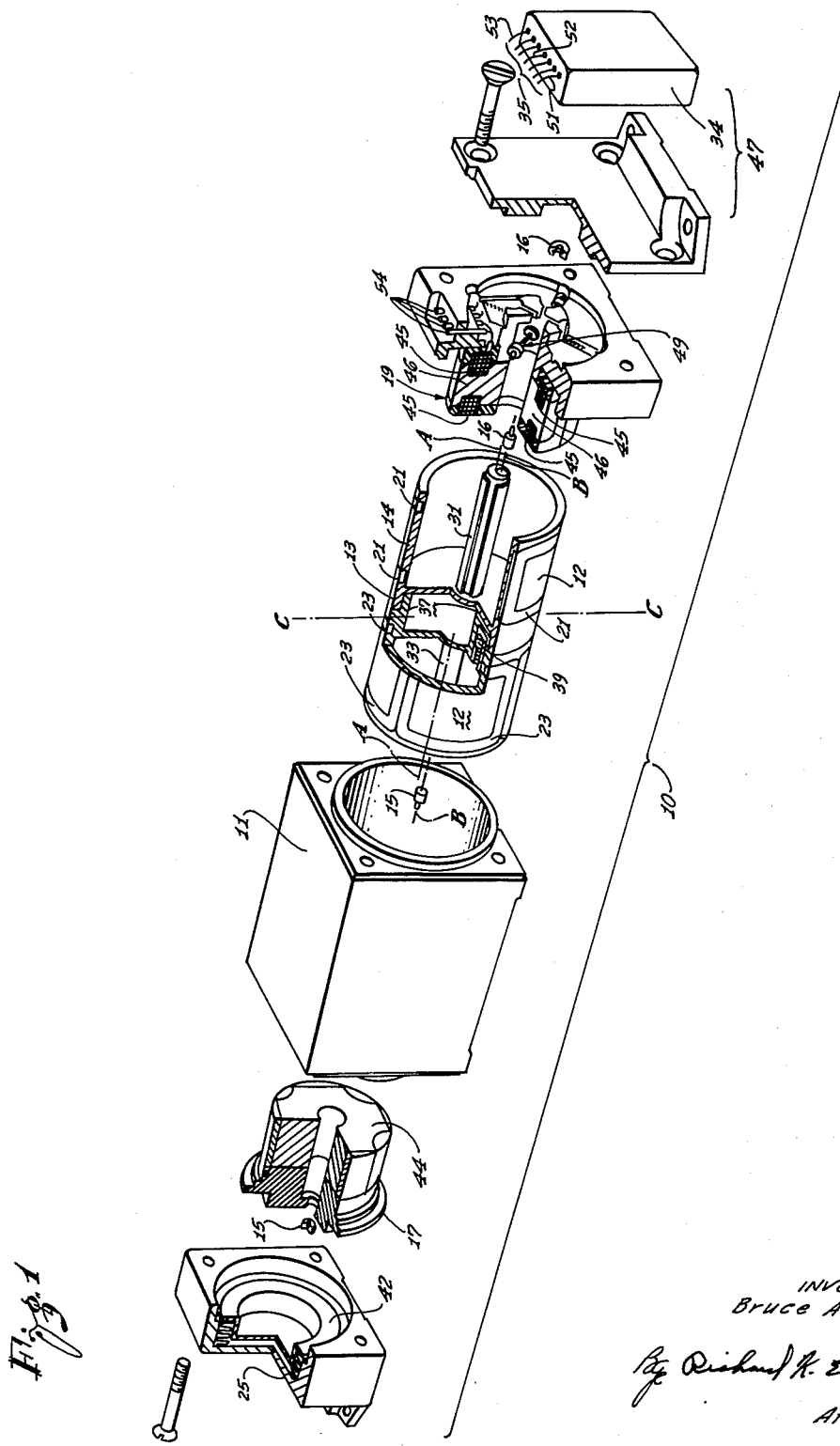

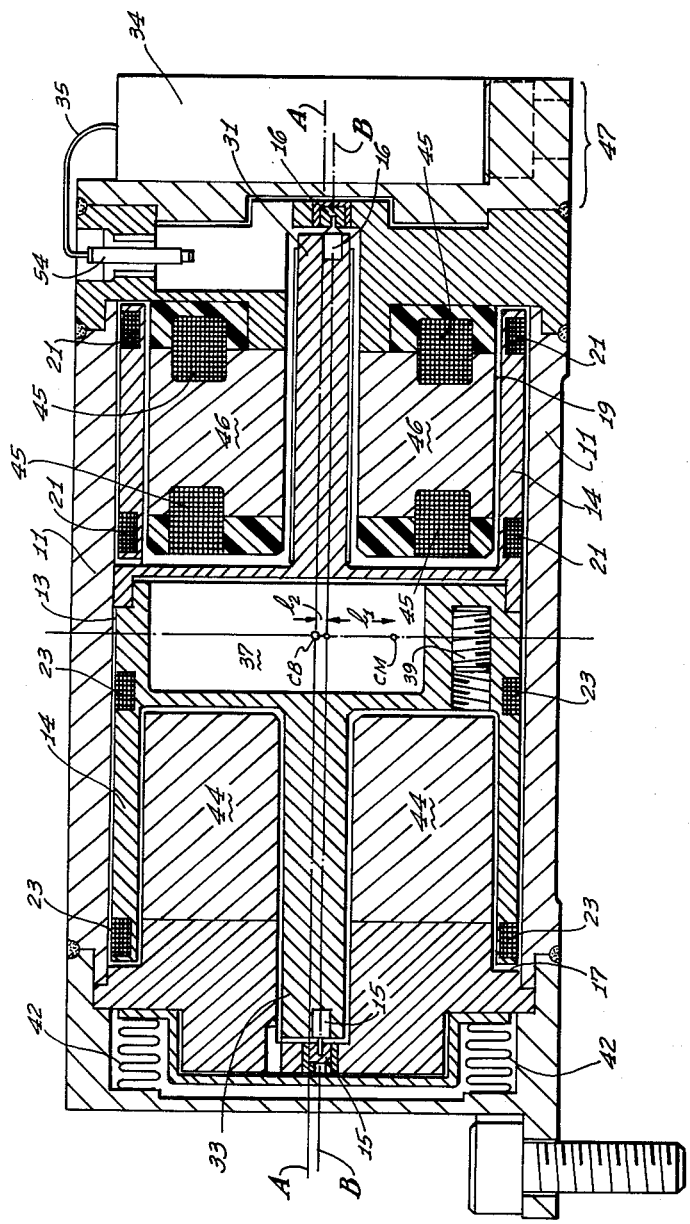

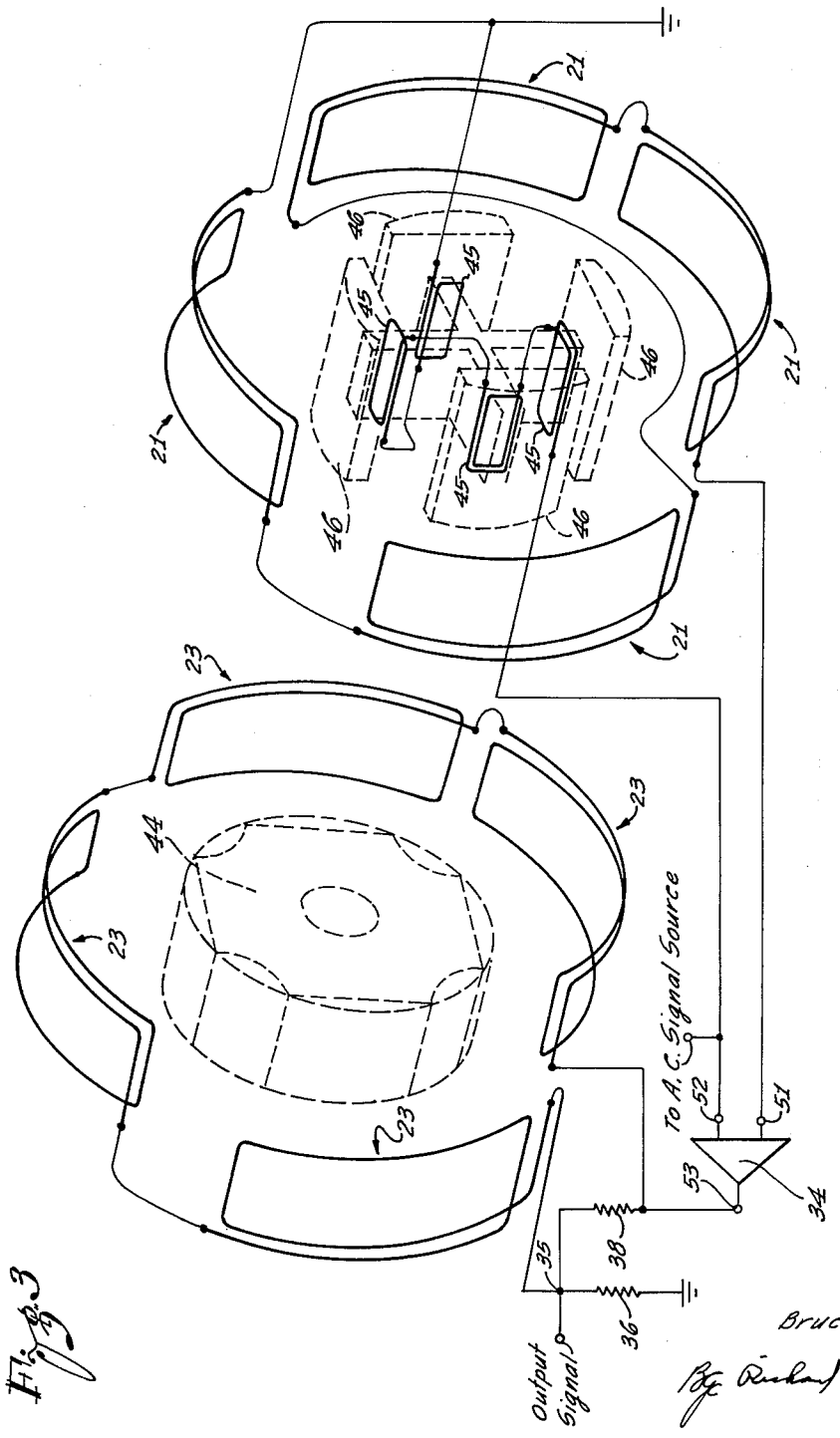

3,213,692
CYLINDRICAL TORQUE BALANCE
ACCELEROMETERS
Bruce A. Sawyer, Woodland Hills, Calif., assignor to
Litton Systems, Inc., Woodland Hills, Calif.
Filed Jan. 10, 1963, Ser. No. 250,644
11 Claims. (Cl. 73—497)

The present invention relates to a floated pendulum, torque balance accelerometer and, more particularly, to a floated pendulum accelerometer mechanized to eliminate temperature induced variations in the accelerometer output signal.

The use of acceleration sensing devices or, in other words, accelerometers in inertial guidance systems for modern day aircraft, ships, and other moving vehicles has become, in recent years, more and more commonplace. In these inertial guidance systems the accelerometers are the essential sensing instruments which provide knowledge with respect to the vehicle's acceleration from which the velocity and distance traveled by the vehicle can be derived. In order to obtain acceleration information along three mutually orthogonal axes, three accelerometers are generally used, one accelerometer being used to sense acceleration along each of said axes.

As is well known in the art, since vehicle velocity and distance traveled are computed by integrating an acceleration signal from the accelerometer, the accelerometer must be an extremely accurate instrument if the guidance system is to have any value. For example, even a relatively small error in the acceleration signal will result in a substantial error in the derived signals representing the velocity and distance traveled by the vehicle over a period of time because the integration process performed on the acceleration signal magnifies the error contained therein.

In an effort to achieve the high standard of accuracy that is demanded of an accelerometer, pendulus accelerometers were developed having a pendulous mass rotatably mounted within an outer accelerometer case by a pair of support bearings which were so constructed to contribute only small frictional forces of resistance to the movement of the pendulous mass. In response to accelerations applied perpendicular to a support axis defined by the support bearings, the pendulous mass will rotate, this rotation being sensed by a sensing unit that produces a signal proportional thereto. The signal produced by the sensing unit is then applied to an associated torquing unit, usually including a torquer magnet and a plurality of torquing coils which interact, in response to the sensing unit signal, to apply a counter-balancing force or torque to the pendulous mass thereby tending to maintain the mass in substantially its null position. The output signal of the sensing unit or the current flowing in the torquing coils may be monitored to provide the desired output signal proportional to, and representative of the acceleration applied to the device.

However, inherent frictional limitations, encountered in the support bearing, considerably limited the sensitivity of these devices. To overcome this limitation the pendulous mass was enclosed in a buoyant envelope, for example, a spherical or cylindrical case, and a flotation fluid introduced between the outer housing of the accelerometer and the pendulous mass case for substantially supporting the pendulous mass by buoyant forces. Nevertheless, the introduction of such a flotation fluid, whose volume and density are temperature dependent, introduced another source of errors in the accelerometer's output signal because of the temperature dependency. Accordingly, temperature increases caused the density of the displaced fluid to become less than the density of the enclosed pendulous mass such that the pivot bearings again substantially supported the weight of the pendulum unit, which factor seriously limited the sensitivity of the accelerometer. Further, because of the temperature variations of the flotation fluid, at any given time the temperatures at varied points within the fluid are not equal, and such inequalities set up pressure gradients which, in general, give rise to spurious torques on the pendulum element.

In addition, as is generally known in the art, it has been found that in torque balance accelerometers the scale factor, the proportionality constant between the magnitude of applied acceleration and the magnitude of applied torquer current, varies as a function of the ambient temperature. This problem arises from metallurgical changes, occurring with temperature increases, in the torquer unit's permanent magnet that result in reductions in the magnetic field strength of the magnet, thereby necessitating a concomitant increase in the amount of torquer current required to produce a given magnitude of counter-force or torque.

In summary, errors in the accelerometer's output signal, that are caused by temperature induced reductions in the magnetic field strength of the torquer magnet, while relatively small on the normal scale, produce significant errors in the derived velocity and distance traveled signals of ultra-precision guidance systems. Moreover, temperature induced pressure gradient torque effects of the flotation fluid on the pendulum element, alone, can introduce serious inaccuracies in the accelerometer's output signal so as to render the instrument useless for many applications. Finally, the sensitivity of a floated pendulum accelerometer can be seriously affected by the decrease in flotation fluid density with increases in temperature if this temperature dependency is left uncompensated for.

In an attempt to avoid some of the above noted limitations, a number of improved accelerometers have been developed in the prior art which have provided some compensation for the spurious torques on the pendulum unit, resulting from temperature induced pressure gradients, and for degradations in magnetic field strength of the torquer magnet. For example, in the patent application, Serial No. 814,487, filed May 20, 1959, now United States Patent Number 3,078,721, for a "Miniaturized Temperature Insensitive Accelerometer," a technique is disclosed wherein the temperature induced variations in the magnetic field strength of the torquer magnets are substantially compensated by the temperature induced density variations of the fluid in which the moving portion of the accelerometer is floated. Similarly, in the patent application, Serial No. 70,209, filed November 18, 1960, now United States Patent Number 3,130,589, for an "Accelerometer Temperature Compensation Trimming Apparatus," a technique is described for maintaining a substantially constant scale factor regardless of temperature increases, the scale factor being defined as a proportionality constant between the magnitude of applied acceleration and the magnitude of applied torquer current. While these improved accelerometers are useful in many applications, they do not provide the required accuracy needed in ultra-precision guidance systems. More particularly, the prior art accelerometers have been mechanized so as to compensate for one or two of the above noted limitations, but have failed to substantially eliminate all sources of accelerometer inaccuracy. All three major problems of temperature dependency in a floated pendulum accelerometer must simultaneously be eliminated or compensated for if the accelerometer is to possess those qualities of ultra-accuracy and ultra-sensitivity that are required of an instrument to be used in the highly sophisticated guidance system of the present and the future.

The present invention, on the other hand, provides a cylindrical, floated pendulum, torque balance accelerometer which obviates the above and other disadvantages of the prior art devices by employing a buoyant, cylindrical pendulum element rotatably mounted within an outer case by a pair of jewel-and-pivot bearings, the bearings defining a rotational axis of the pendulum element displaced from the center of mass and buoyancy of the pendulum element by predetermined distances for providing first order compensation for temperature induced variations in the torquer magnet field strength. The accelerometer's outer case is filled with a high density flotation fluid for substantially supporting the pendulum element by buoyant forces. According to one of the basic concepts of the invention, the pendulum element is so constructed to have a longitudinal axis of symmetry such that the rotational axis of the pendulum element may be offset a predetermined distance therefrom. This feature allows the variations in scale factor, due to temperature caused variations in the magnetic field strength of the torquer magnet, to be compensated by equal and opposite variations in the scale factor caused by temperature induced variations in the flotation fluid density. In addition, an even greater degree of compensation is achieved by including an extremely accurate, temperature insensitive resistor which is connected in parallel with the torquing coils of the torquing unit thereby tending to keep constant the amount of current delivered to the torquing coils in response to a given magnitude of applied acceleration, independent of the surrounding ambient temperature. The combination of the cylindrical shape of the pendulum element, the temperature insensitive resistor connected in parallel with the torquing coils, and the offsetting of the rotational axis of the pendulum element from its longitudinal axis of symmetry together with the particular mechanization of the angular motion sensor and torque element provides, for all intents and purposes, an extremely accurate accelerometer insensitive to temperature variations.

According to one embodiment of the invention, the accelerometer includes an outer housing or case enclosing a cylindrical pendulum element which is formed by a cylindrical shell having a longitudinal axis of symmetry, the shell supporting a radially displaced center of mass. Further, the cylindrical pendulum element is rotatably mounted within the outer housing by a pair of jewel-and-pivot bearings that define an axis of rotation. Within the cylindrical shell of the pendulum element, at an end thereof to be hereinafter referred to as the sensing end, is mounted a pickoff exciter assembly. The pickoff exciter assembly functions, in cooperation with a group of four pickoff coils (positioned upon an outer surface of the cylindrical pendulum element at the sensing end), to detect rotational movement of the pendulum element. At the other end of the cylindrical pendulum element, hereinafter referred to as the torquing end, and within the pendulum element's cylindrical shell, is mounted a torquer magnet assembly which acts, in cooperation with a plurality of torquer coils (positioned on the outer surface of the pendulum element at the torquing end), to maintain a substantially constant rotational position of the pendulum element.

As was previously stated, the pendulum element is so constructed to have the rotational axis of the pendulum element offset a predetermined distance from the longitudinal axis of symmetry. By so doing, the center of buoyancy of the cylindrical pendulum element no longer lies on the rotational axis, but is displaced a first predetermined distance therefrom. This feature allows buoyant forces to produce rotational moments about the rotational axis of the pendulum element and takes full advantage of the temperature induced density variations of the flotation fluid to compensate for magnetic field strength degradations in the torquer magnet.

It can be seen that an applied acceleration produces a rotational movement of the pendulum element due to the location of the center of mass displaced radially from the rotational axis. It is the function of the torquer unit to counteract this rotational movement in response to a signal produced by the angular motion sensor that senses the movement and produces a signal proportional thereto. As the ambient temperature of the accelerometer is increased, the magnetic field strength of the torquer magnet is reduced and the torquer unit would conventionally require a greater amount of current through the torquer coils to produce an equivalent amount of counter-torque. However, in accordance with the present invention, the necessity for increasing the current flowing through the torquer coils is eliminated in that the combination of the torquer magnet and torquer coils is allowed to produce a lesser amount of counter-torque on the pendulum element, the counter-torque difference being provided by the lessening of buoyant forces of the flotation fluid acting upon the displaced center of buoyancy. More specifically, if the center of buoyancy and center of mass are positioned relative to the pivot or rotational axis, the former on one side of the pivot axis and the latter positioned on the other side of the pivot axis, the buoyant forces imposed upon the center of buoyancy, as a result of the temperature induced decrease in the flotation fluid density, almost exactly compensate and counteract the loss of balancing force resulting from the degradation in magnetic field strength. Accordingly, the magnitude of current flowing through the torquer coils becomes substantially independent of the surrounding accelerometer temperature. Minute differences in balancing or restoring force are regulated by the temperature insensitive resistor connected in parallel with the torquing coils.

It is therefore an object of the present invention to provide a highly accurate, temperature insensitive, miniaturized, cylindrical, torque balance accelerometer.

It is another object of this invention to provide a floated pendulum accelerometer whose cylindrical pendulum element minimizes pressure gradient torque effects.

It is a further object of the present invention to provide a miniaturized, floated pendulum accelerometer wherein variations in scale factor due to temperature caused variations in the magnetic field strength of the torquer magnet are compensated by equal and opposite variations in scale factor caused by temperature induced changes in the flotation fluid density.

It is yet another object of the present invention to provide a miniaturized accelerometer that employs a cylindrical pendulum element wherein the center of mass may be translated in three mutually perpendicular directions.

Still another object of the present invention is to provide a cylindrical torque balance accelerometer employing a torquer element that includes a temperature insensitive resistor for providing second order compensation for degradations in the magnetic field strength of the torquing magnet.

The novel features which are believed to be characteristic of the invention, both as to its organization and method of operation, may be better understood from the following description considered in connection with the accompanying drawings wherein one embodiment of the invention is illustrated by way of example. However, it is to be expressly understood that the drawings are for the purpose of illustration and description only and that the scope of this invention should not be limited except by a fair interpretation of the appended claims.

FIGURE 1 is an exploded isometric view of a temperature insensitive, cylindrical, torque balance accelerometer of the present invention;

FIGURE 2 is a partially sectionalized view of the accelerometer shown in FIGURE 1; and FIGURE 3 is a schematic diagram illustrating the electrical servo feedback circuit of the present accelerometer invention as shown in FIGURES 1 and 2.

Referring now to the drawings wherein like or corresponding parts are referred to by the same reference characters throughout the several views, there is shown in FIGURE 1 an exploded, three-dimensional view of an accelerometer 10 of the present invention. As is shown in FIGURE 1, accelerometer 10 includes an outer housing or case 11 enclosing a cylindrical pendulum element 13 formed by a cylindrical shell 14 having a longitudinal axis of symmetry A—A and having a pair of cylindrical shafts 31 and 33 affixed to cylindrical shell 14 with their longitudinal axes coincident with the axis of symmetry A—A of the shell.

Continuing with the discussion of the invention, as illustrated in FIGURE 1, pendulum element 13 is rotatably coupled to housing 11 through a pair of jewel-and-pivot bearings 15 and 16 which define an axis of rotation, B—B, around which the pendulum element is rotated. More particularly, pendulum element 13 is coupled to housing 11 by bearings 16 and 15 that are mounted on a pickoff exciter assembly 19 and a torquer magnet assembly 17, respectively; both assemblies, as will hereinafter be described in more detail, are firmly affixed to outer housing 11. At one end of the cylindrical pendulum element, hereinafter referred to as the sensing end, a plurality of four pickoff coils 21 is positioned in recesses in an outer surface 12 of shell 14 and is operable (in conjunction with an exciter element 19, positioned within an annular cavity formed by shaft 31 and shell 14 of the pendulum element) for generating an acceleration signal proportional to the rotational movement of the pendulum element. The combination of pickoff coils 21 and exciter element 19 will hereinafter be referred to as the angular motion sensor. As is further shown in FIGURE 1, at the other end of the cylindrical pendulum element, hereinafter referred to as the torquing end, a plurality of four torquing coils 23 is positioned in recesses in the outer surface 12 of shell 14 and is operable, in response to an applied electrical current and in conjunction with a substantially cylindrical torquer magnet assembly 17 (positioned within an annular cavity formed by shaft 33 and shell 14) to exert upon pendulum element 13 a force or torque for tending to maintain the pendulum element in a predetermined null position. Similar to the above, the combination of torquing coils 23 and torquer magnet assembly 17 will be hereinafter referred to as the torquer element.

When pendulum element 13 is positioned within outer case 11, the space between the pendulum element and the case is filled with a high density flotation fluid, the density of the fluid being determined so as to substantially support the pendulum element within the case by buoyant forces thereby reducing the frictional drag on the jewel-and-pivot support bearings. In practice, the weight force on the bearings may be reduced to less than a few dynes. The outer case of the accelerometer of the present invention is of dimension such that the clearance between it and cylindrical pendulum element 13 is very small for minimizing flotation fluid thermal gradient torques.

To compensate for flotation fluid volume expansion, due to increases in the ambient temperature surrounding the accelerometer, an expansion bellows assembly 25 (including an expansion bellows 42) has been provided at the torquing end of the accelerometer's outer case; the torquing end of the outer case corresponds to the torquing end of the pendulum element, expansion bellows assembly 25 closing off and sealing that end. Expansion bellows 42 is capable of expanding or contracting in response to the expansion or contraction of the flotation fluid and thereby tends to maintain an approximately constant pressure within the flotation fluid. As is further illustrated in FIGURE 1, a demodulator-amplifier assembly 47 is mounted at the sensing end of outer case 11 for closing off and sealing this end of the outer case; the sensing end of the outer case corresponds to the sensing end of the pendulum element. Demodulator-amplifier assembly 47 includes a demodulator-amplifier 34 having a plurality of electrical terminals 35 connected thereto. Demodulator-amplifier 34 produces, in response to the acceleration signal generated by the angular motion sensor, the electrical torquer current that is supplied to the torquer element.

A more rigorous examination of the angular motion sensor reveals that pickoff exciter assembly 19 includes a plurality of four radially oriented contact members 49, for making electrical connection to the torquer coils and pickoff coils, and a plurality of four salient poles 46. As is shown in FIGURE 1, an electrical exciter coil 45 is wound around each salient pole 46 enabling the poles to be energized as electromagnets by the application of an alternating current to coils 45 for providing an electromagnetic field which pickoff coils 21 will couple when the pendulum element rotates, thereby causing an acceleration voltage to be generated in the pickoff coils.

Referring now with more particularity to the mechanization and mounting arrangement of the torquer element, as shown in FIGURE 1, it will be noticed that torquer magnet assembly 17 includes a substantially cylindrical, four pole, permanent torquer magnet 44 coaxially mounted with shaft 33 within the cavity formed by cylindrical shell 14 of pendulum element 13. As was hereinbefore noted, torquing coils 23 are set into recesses made in outer surface 12 of pendulum element 13, each of the four torquing coils occupying approximately one-fourth of the cylindrical surface at the torquing end of the pendulum element. As will be hereinafter discussed, the application of the electrical torquer current to the torquing coils 23, which are electrically connected in a serial configuration, results in a torque being produced on cylindrical pendulum element 13 about axis of rotation B—B of the pendulum element.

Further examination of the cylindrical pendulum element reveals that pendulum element 13 includes an airtight buoyant chamber 37 and a mass assembly 39 displaced from the axis of symmetry. As will be discussed in connection with FIGURE 2, pendulum element 13 has a center of buoyancy (CB) positioned on axis of symmetry A—A and a center of mass (CM) positioned a predetermined distance from the axis of symmetry. Still further, a radial line defined by the center of mass and the geometric center of the cylindrical pendulum element, when pendulum element 13 is mounted and oriented within outer housing 11, is perpendicular to an axis C—C, as shown in FIGURE 1, that represents a sensitive axis of the accelerometer.

In further accord with the basic principles of the present invention, the axis of rotation of the cylindrical pendulum element is offset from the axis of symmetry of the element. By so doing, the center of buoyancy of the pendulum element is concomitantly displaced from the axis of rotation for enabling temperature-induced variations of the flotation fluid surrounding pendulum element 13 to cooperate with, and compensate for temperature caused changes in the magnetic field strength of the torquer magnet within the torquer element of the accelerometer.

Attention is directed to FIGURE 2 wherein there is shown a partially sectionalized view that better illustrates the assembled positions of the aforementioned elements of the accelerometer of the present invention. As is shown in FIGURE 2, the cylindrical pendulum element has been rotated 90° from its null position to better illustrate the construction of central buoyant chamber 37 in relation to the placement of mass assembly 39. More particularly, FIGURE 2 illustrates cylindrical pendulum element 13 rotatably mounted within outer housing 11 by the pair of jewel-and-pivot bearings 15 and 16. FIGURE 2 further illustrates the mounting of substantially cylindrical torquer magnet assembly 17 within the annular cavity of the pendulum element at the torquing end, as was described hereinabove, and the embedding of torquing coils 23 in grooves cut in the outer surface of the pendulum element 13 at the torquing end. Still further, pickoff exciter assembly 19 is shown mounted within the annular cavity of the pendulum element at the sensing end, two of the four salient poles 46 of pickoff exciter 19 being shown in cross-section. Pickoff coils 21 of the angular motion sensor are shown to be embedded in grooves cut in the outer surface of cylindrical pendulum element 13 at the sensing end, as to be in register with the pickoff exciter for sensing, in combination with pickoff exciter assembly 19, angular rotation of pendulum element 13 in response to applied translational accelerations.

Continuing with the discussion of FIGURE 2, shown therein are the electrical connections from demodulator-amplifier 34 to the torquer element and the angular motion sensor that are made via a plurality of electrical lead-in elements 54. As shown in FIGURES 1 and 2, lead-in elements 54 are mounted on pickoff exciter assembly 19 and interconnect the plurality of four radially oriented contact members 49 and terminals 35 of the associated circuitry of demodulator-amplifier 34, contact members 49 making electrical connection to the torquing coils and the pickoff and exciter coils of the angular motion sensor.

In FIGURE 3 there is shown a schematic diagram of the electrical circuit of accelerometer 10, wherein is illustrated the serial connection of torquing coils 23 and a scale factor resistor 36 between electrical ground and an output terminal 53 of the plurality of electrical terminals 35 of demodulator-amplifier 34, the torquing coils having a precisely value, temperature insensitive resistor 38 connected in parallel therewith. FIGURE 3 further illustrates the serial electrical connection of pickoff coils 21 between electrical ground and an input terminal 51 of the plurality of electrical terminals 35 of demodulator-amplifier 34. It should be noted that exciter coils 45, wound around the four salient poles 46, are serially interconnected from electrical ground to an A.C. signal source. It is also apparent that the polarity of the electromagnetic fields generated by coils 45, in response to an A.C. signal produced by the A.C. signal source, are such that an acceleration voltage is induced in pickoff coils 21 whenever the pickoff coils rotate from the null position with respect to the generated electromagnetic field. The demodulator-amplifier is responsive to the acceleration voltage thereby generated for demodulating the acceleration voltage and transforming the voltage into an electrical torquer current whose magnitude is representative of the magnitude of angular deviation of the pendulum from the null position and whose polarity is representative of the direction of the deviation, that is, clockwise or counterclockwise. More particularly, as will be apparent to one skilled in the art, the acceleration voltage, applied to demodulator-amplifier 34 at terminal 51, is compared with the A.C. signal applied to terminal 52 of the demodulator-amplifier; the demodulator-amplifier, after having compared the applied signals, produces the electrical torquer current which is applied to torquing coils 23, which, in turn, and incombination with the torquer magnet 44 generates a restoring torque or force tending to maintain the cylindrical pendulum element in substantially its null position. An output signal of the accelerometer may be obtained by sampling, at terminal 35, the electrical torquer current applied to the parallel combination of coils 23 and resistor 38. Scale factor resistor 36 merely transforms the electrical torquer current into a precisely determinable voltage suitable for application to an analog computing device.

With the foregoing structure in mind, the specific operation of the temperature compensated, cylindrical, torque balance accelerometer of the present invention may be easily understood. For example, as shown in FIGURE 2, the sensitive axis of the accelerometer is oriented perpendicular to the plane of the drawing so that the accelerometer senses translational accelerations applied parallel thereto. These accelerations tend to produce a rotation of cylindrical pendulum element 13 about rotational axis B—B since center of mass CM is removed from the rotational axis. As the pendulum element begins to rotate, pickoff coils 21 move from their position adjacent to the four electromagnets formed by salient poles 46 and coils 45. As previously described, upon excitation by the A.C. signal, the electromagnets generate magnetic lines of force and coils 21 are positioned on the pendulm element in such a manner that when the pendulum element is in the null position, no electromotive force is induced across the coils. However, the movement of pickoff coils 21 from the null position causes the coils to link or intercept more lines of force of a predetermined polarity and less of the opposite polarity so that the acceleration voltage is induced in the pickoff coils, the magnitude of the induced voltage being representative of the magnitude of the movement of the pendulum element while the phase of the induced voltage represents the direction of movement.

As is indicated in FIGURE 3, the acceleration voltage is simultaneously applied to demodulator-amplifier 34 together with the A.C. signal at terminals 51 and 52, respectively. Demodulator-amplifier 34 is responsive to the application of the foregoing described signals to demodulate the A.C. acceleration voltage to produce a D.C. electrical torquer current whose amplitude is proportional to the magnitude of the pendulum movement and whose polarity is representative of the direction of the pendulum angular rotation. As is shown in FIGURE 3, the electrical torquer current is applied to torquer coils 23 which act, in combination with torquer magnet 44, to generate a torque tending to restore the pendulum element to the null position.

Referring now to the temperature compensating features of the invention, and more particularly, considering the temperature dependency of the accelerometer and the compensation thereof on a more quantitative basis, the principal factors of temperature dependency are the metallurgical changes which occur within torquer magnet 44 causing a reduction in magnetic field strength, an expansion of the flotation fluid with increasing temperature lessening the flotation fluid density and causing the support bearings to be loaded by the weight of the pendulum element, and the generation of hydrostatic pressure gradient torques on the pendulum element caused by temperature induced density variations of the flotation fluid. Each of the above noted temperature dependency factors is capable of severely limiting the accuracy of an accelerometer. An examination of the decreasing magnetic field strength in response to temperature increases reveals that a greater current must be passed through torquing coils 23 to produce a predetermined restoring perature induced magnetic field strength variations go perature induced magnetic field strength variations go uncompensated for. Since the accelerometer's output signal is obtained by monitoring the applied torquer current and a given magnitude of torquer current should be proportional to a given magnitude of applied acceleration, irrespective of the accelerometer's ambient temperature, it follows that an inaccurate output signal is produced by the accelerometer in response to an applied acceleration if an additional quantity of torquer current must be applied as the ambient temperature increases.

On the other hand, as the temperature increases, the density of the flotation fluid surrounding the cylindrical pendulum element becomes less than the density of the pendulum element so that a net torque is produced on the pendulum. This torque is equal to the net positive or negative buoyant force acting over the effective lever arm equal to the distance between the axis of rotation and the center of buoyancy CB of the pendulum element. As was hereinbefore stated, the present technique of temperature compensation places the first of these undesirable temperature effects, namely, the change in buoyancy forces of the flotation fluid on pendulum element 13, in direct opposition to the loss in torquing forces due to the degradation of magnetic field strength of torquer magnet 44. In so doing, the buoyant forces acting on the center of buoyancy displaced from the axis of rotation, produce a torque about the axis and substantially compensate for the loss of torque by the torquer element without necessitating the application of additional electrical torquer current to coils 23 for returning pendulum element 13 to its null position.

More specifically, pendulum element 13 is constructed such that the distance between the center of buoyancy and a point of intersection of the axis of rotation and a line defined by the centers of mass and buoyancy is determined by the following equation:

$$l_2 = \frac{\alpha}{\gamma}(l_1 + l_2) \qquad (1)$$

wherein the quantity $(l_1+l_2)$ represents the distance between the center of buoyancy and the center of mass along the line joining the two centers, $l_2$ is the distance between the center of buoyancy and the point of intersection of the line joining the centers of mass and buoyancy and the rotational axis, $l_1$ is the distance between the center of mass and the point of intersection of the line joining the centers of mass and buoyancy with the rotational axis, $\gamma$ is the volume coefficient of expansion of the flotation fluid, and $\alpha$ is the coefficient of variation of the magnitude of the restoring torque with temperature. If the center of buoyancy and the center of mass are positioned relative to the axis of rotation as determined by Equation (1), where $\alpha$ and $\gamma$ are positive quantities and the axis of rotation is positioned between the centers of mass and buoyancy, the loss of buoyant force at the center of buoyancy acting over the effective lever arm between the center of buoyancy and the axis of rotation, will substantially counteract the loss of restoring torque by the torquer element for returning the pendulum element to the null position. Accordingly, the necessity for increasing the current applied to coils 23 is substantially eliminated. This compensating feature allows the magnitude of torquer current supplied to coils 23 of the torquer element to remain substantially proportional to the applied accelerations of interest, regardless of ambient temperature.

With the major variations of scale factor eliminated, further compensation for the temperature degradations in the magnetic field strength of torquer magnet 44 is provided by precisely valued, temperature insensitive resistor 38 connected in parallel with torquing coils 23. More particularly, resistor 38 connected between output terminal 53 of demodulator-amplifier 34 and accelerometer output terminal 35 is of a value which tends to keep constant the magnitude of electrical torquer current delivered by demodulator-amplifier 34 to the parallel combination of torquing coils 23 and resistor 38. The value of resistor 38 is determined by first considering that in the absence of shunt resistor compensation, the current flowing through torquing coil 23 is given by the expression $$I_R = I_0(1 - a\Delta T) \qquad (2)$$

where $I_R$ is the torquer current, $I_0$ is the current at a given temperature produced in response to a known magnitude of applied acceleration, $a$ is the temperature coefficient of the accelerometer, and $\Delta T$ is the change in temperature from the given temperature, and further considering that the torquing coils have the following resistance characteristic:

$$R = R_0(1 + b\Delta T) \qquad (3)$$

where $R_0$ is the resistance of the torquing coils at a first predetermined temperature, $R$ is the resistance of the torquing coils at a second temperature $\Delta T$ removed from the first temperature, and where $b$ is the temperature coefficient of resistance of the coils. It can readily be shown by a mathematical combination of Equations (2) and (3) that the temperature insensitive resistor connected in parallel or shunt with the torquing coils must be of a value defined by the expression $$R_s = R_0\left(\frac{b}{a} - 1\right) \qquad (4)$$

where $R_s$ is the resistance of temperature insensitive resistor 38. It can also readily be shown that the value of resistor 38, $R_s$, must be at least one-half of the value given in Equation (4). A value of $R_s$ equal to one-half the value specified in Equation (4) produces an accelerometer having a temperature coefficient equal to $+a$ as contrasted with the coefficient of $-a$ which appears in Equation (2). Accordingly, resistor 38 must be of a value at least equal to the value of $$\frac{R_0}{2}\left(\frac{b}{a} - 1\right)$$

to improve the characteristics of the accelerometer, and will provide some improvement for all greater values of resistance up to infinity. Accordingly, as will be apparent to one skilled in the art, temperature insensitive resistor 38 has the effect of making the magnitude of torquer current flowing through coils 23 even more substantially independent of the accelerometer's ambient temperature.

The final temperature compensating feature of the present invention is embodied in the cylindrical shape of the pendulum element, the cylindrical shape serving a useful function when one considers that heat is transferred from the accelerometer's external surrounding to the flotation fluid which supports the pendulum element. More specifically, it is the cylindrical shape of the pendulum element which minimizes the effects of hydrostatic pressure gradients resulting from temperature induced variations of the flotation fluid. Still further, the effects of convection currents caused by temperature differences across the pendulum element, that would normally produce shear moments on the pendulum element, have been substantially minimized by reducing the amount of clearance between the cylindrical outer surface of the pendulum element and the outer case, thereby reducing the amount of flotation fluid in the annular space.

As is apparent from the description of each temperature compensating feature, it is the combination of these features in the embodiment of the present invention which provides a highly accurate, temperature insensitive, miniaturized, cylindrical torque balance accelerometer that may be employed in ultra-precision guidance systems. The absence of any one of the temperature compensating features would severely limit the accuracy of the instrument. Accordingly, the present invention, embodying a number of distinct temperature compensating features, is capable of providing, in response to an extremely wide range of applied accelerations, an ultra-accurate acceleration signal regardless of accelerometer ambient temperature.

As is well known to those skilled in the art, the ideal orientation of the sensitive axis is achieved when the rotational axis and the line defined by the center of mass and the center of buoyancy intersect. However, when these two lines do not intersect the sensitive axis is rotationally displaced by temperature changes of the flotation fluid, rotation of the sensitive axis as a function of temperature changes of the flotation fluid producing minor cross-coupling errors in the accelerometer's output signal. Normal manufacturing tolerances allow the rotational axis to fall as much as .002 inch from intersection with the center of mass-center of buoyancy line.

This problem has been overcome by providing a set of trimming screws, which comprise mass assembly 39, by an adjustment of which the center of mass of the pendulum element can be relocated for precisely trimming for the intersection of the rotational axis and the center of mass-center of buoyancy line. The center of mass of the pendulum element can be translated by a predetermined amount along each of three mutually perpendicular axes by the movement of the trimming screws in or out of their fitted holes. This trimming action tends to eliminate the pendulum element's sensitivity to cross-coupling as a function of flotation fluid temperature changes and, more particularly, reduces the rotation angle of the sensitive axis to less than 0.5 arc-sec./° F.

Small changes in the pendulousity or scale factor of the instrument, caused by repositioning these weights, are of no consequence since the overall scale factor is a function of the value of scale factor resistor 36, the value being determined during the final accelerometer assembly operation. The fact that, in effect, the line defined by the centers of mass and buoyancy is rotated slightly within the pendulum element when the weights are repositioned is also of no consequence since the sensitive axis remains orthogonal to the line defined by the center of mass and buoyancy and this line remains substantially orthogonal to rotational axis.

The phrase "tend" as employed herein in describing the response of the pendulum element to an acceleration of interest and to the applied counter-torquer is used because the pendulum element never departs from its null position by more than a relatively small rotational distance owing to the fact that the pickoff acceleration signal is continuously utilized to restore the pendulum element to its null position by the energization of the torquer coils through the external high gain servo amplifier and demodulator which constantly responds to the pickoff acceleration signal.

It should be noted that the electrical conductors interconnecting the torquing coils, pickoff coils, and pickoff exciter assembly may be brought out directly through the outer housing of the accelerometer in any suitable manner as, for example, by conductors 54 as shown in FIGURES 1 and 2. However, the contact members interconnecting the pickoff coils and the torquing coils to conductors 54 should not be allowed to exert any spring or frictional forces on the pendulum element, for obvious reasons. Although not shown in the drawings specifically, the electrical connections to the pickoff coils are made by means of very light pigtails disposed radially between outer case 11 and the cylindrical pendulum element's central shaft 31. These lead-in pigtails are essentially very fine coil springs which contribute only very minute torques to the system. Despite their apparent delicacy, the pigtails have demonstrated exceptional stability and reliability in the present instrument. Since numerous techniques and wire types for providing essentially "no-torque" connections are very well known in the art, a detailed description of these interconnections is unnecessary.

As stated previously hereinabove with respect to the descriptions of FIGURES 1 and 2, the pendulum element is surrounded by a flotation fluid which serves to float the unit such that the jewel-and-pivot bearings are effectively only as guiding devices and are not loaded by the weight of the pendulum unit. Serious limitations on the selection of the flotation fluid for miniaturized accelerometers require that the fluid be relatively inert and sufficiently dense to permit substantial flotation of the element. In choosing one of several known flotation fluids which may be employed in the embodiment of the invention as shown in FIGURE 1, Bromotrifluoroethylene Blend, with a density of 2.145 grams per cubic centimeter, was found suitable in the disclosed embodiment.

It should also be noted that the accelerometer is mechanized so that it may be considerably reduced both in volume and in weight without effecting the precision of the instrument. Besides its compact construction, the accelerometer is capable of operation with extreme accuracy having an extraordinarily high null sensitivity.

It will be recognized by those skilled in the art that the particular design of the demodulator-amplifier 34 employed by the accelerometer of the present invention is determined by a number of design and service parameters such as, for example, the mass of the pendulum element, the null sensitivity and speed of response desired, and the maximum permissible deviation from mechanical null position in response to full scale acceleration. A number of suitably efficient micro-miniaturized and semi-conductor demodulator-amplifiers are known in the art, and the particular electronic design of these units incorporate specific features necessary for the application of the present accelerometer to the systems of interest. It is obvious that the design chosen for the demodulator-amplifier in no way limits the inventive features of the present accelerometer.

As will be apparent to one skilled in the art, the use of a direct current motor design for the torquer element possibly could give rise to the classical problem of armature reaction occurring at the poles of torquer magnet 44. This effect is described on page 101 and those pages following of Alfred Still and Charles S. Siskind's book, Elements of Electrical Machine Design, published in 1954 by McGraw-Hill Book Company, Inc., of New York, Toronto and London. Recognizing this possible future limitation in the present accelerometer, it is suggested that one means of compensation that could be employed would be to provide the poles of torquer magnet 44 with compensating windings embedded in slots on the pole faces, the windings being connected in series with coils 23. This method of compensation is described in page 385 and those pages following of Clifford C. Carr's text, Electric Machinery, published in 1958 by John Wiley & Sons, Inc., of New York and London, and therefore a more detailed description will not be undertaken herein. However, it should be pointed out that, while a particular method of compensating for the armature reaction effect has been suggested herein, neither the discussion of the effect nor the selection of a means of compensation therefor should be considered as limitations of the present invention.

It is clear, of course, that numerous modifications and alterations can be made in the miniaturized, cylindrical, temperature insensitive accelerometer of the present invention, herein described, without departing from the spirit of the invention. For example, as was hereinbefore stated, numerous demodulator - amplifier combinations could be employed to convert the pickoff error signal generated by the angular motion sensor into the electrical signal needed to be applied to the torquer coils for generating the restoring torque. From the above, it should also be noted that many types and configurations of torquing means and angular motion sensor means could be employed without departing from the spirit of the scope of the present invention. More particularly, the present invention utilizes the cylindrical shape of the pendulum element to reduce shear and convection torques of the flotation fluid on the pendulum element. The accelerometer of the present invention further utilizes a particular placement of the center of buoyancy with respect to the center of mass wtihin the pendulum element to establish the cooperative compensation action of the change in density of the flotation fluid for counteracting the decrease in magnetic field strength of the torquer magnet as the ambient temperature is increased. Accordingly, it is to be expressly understood that the invention is limited only by the spirit and scope of the appended claims.

What is claimed as new is:

1. In a floated, torque balance, pendulous accelerometer for sensing translational accelerations applied along a sensitive axis of the accelerometer and producing a signal proportional thereto, the accelerometer including a torquer magnet for generating a magnetic field to restore the accelerometer pendulous element to a null position, the combination comprising:

an outer case;

a flotation fluid located within said case;
a cylindrical pendulum element positioned within said case and substantially floated by said flotation fluid, said pendulum element having a rotational axis and a longitudinal axis of symmetry, said rotational axis being substantially parallel with and offset from said axis of symmetry, said pendulum element further having a center of buoyancy positioned a first predetermined distance from said rotational axis and a center of mass radially displaced a second predetermined distance from said axis of symmetry so that temperature induced density variations in the flotation fluid may alter the flotation fluid support of said pendulum element to substantially compensate for temperature induced variations in the torquer magnet field strength, translational accelerations applied parallel to the sensitive axis of the accelerometer when said pendulum element is in the null position tending to produce rotational moments on said pendulum element about said rotational axis for rotating said pendulum element;
a pair of jewel-and-pivot bearings for rotatably mounting said cylindrical pendulum element within said case, said pair of bearings defining said rotational axis;
an angular motion sensor positioned in register with said cylindrical pendulum element and responsive to the rotation of said pendulum element for producing a signal proportional thereto; and
a torquer element, including the torquer magnet, responsive to said signal for generating a magnetic field to exert a torque on said cylindrical pendulum element opposing the rotation of said pendulum element and tending to maintain said pendulum element at the predetermined null position.

2. The combination defined in claim 1 wherein said cylindrical pendulum element includes an open ended cylindrical shell having a buoyant chamber therein.

3. In a pendulous, torque-balance accelerometer for sensing translational accelerations applied along a sensitive axis of the accelerometer and producing a signal proportional thereto, the combination comprising:
an outer case;
a flotation fluid located within said case;
a cylindrical pendulum unit including an open ended cylindrical shell having a buoyant chamber therein, said pendulum unit being rotatably positioned within said case and substantially floated by said flotation fluid, said pendulum element having a rotational axis and a longitudinal axis of symmetry, said rotational axis being substantially parallel with and offset from said axis of symmetry, translational accelerations applied parallel to the sensitive axis of the accelerometer tending to produce rotational moments on said pendulum unit about said rotational axis for rotating said pendulum unit;
a pair of jewel and pivot bearings for rotatably mounting said cylindrical pendulum unit within said case, said pair of bearings defining said rotational axis;
a torquer element, including a torquer magnet, responsive to a signal for generating a magnetic field to exert a torque on said cylindrical pendulum unit opposing the rotation of said pendulum unit and tending to maintain said pendulum unit at a predetermined position; and
an angular motion sensor positioned in register with said cylindrical pendulum unit and responsive to the rotation of said pendulum unit for producing said signal, said angular motion sensor including four pick-off coils and an exciter means, said exciter means positioned in one of the open ends in said cylindrical shell and said pick-off coils being affixed to said pendulum element in register with said exciter means, said pick-off coils being responsive to angular rotation of said pendulum element for producing, in combination with said exciter means said signal proportional to the angular rotation of said pendulum element.

4. The combination defined in claim 3 wherein said torquer element further includes four torquing coils and the torquing magnet, said torquing magnet being substantially cylindrical in shape and being coaxially positioned in the other open end of said pendulum element cylindrical shell, said torquing coils being affixed to said pendulum element in register with the torquing magnet, said coils being responsive to said signal for applying to said pendulum element, in combination with the torquing magnet, a restoring torque tending to maintain said cylindrical pendulum element in a substantially null position.

5. The combination defined in claim 3 wherein said cylindrical pendulum element further includes a plurality of adjustably positioned trimming screws positioned on said cylindrical pendulum element near the longitudinal geometric center of said element for displacing the center of mass of said pendulum element in accordance with the position of said screws.

6. The combination defined in claim 5 wherein said torquer element further includes a temperature insensitive resistor connected in parallel with said torquing coils to further compensate for temperature induced variations in the magnetic field strength of said torquing magnet, the value of said resistor being defined by the expression, $$R_0\left(\frac{b}{a}-1\right)$$

where $R_0$ is the total resistance of said four torquing coils at a first predetermined temperature, $b$ is the temperature coefficient of resistance of said coils, and $a$ is the temperature coefficient of the accelerometer.

7. In a miniaturized accelerometer, the combination comprising:
an outer case;
an open ended cylindrical pendulum element positioned within said case and having a longitudinal axis, a center of mass, a center of buoyancy, and a rotational axis parallel to said longitudinal axis and offset a first predetermined distance therefrom, said center of mass being displaced from said longitudinal axis for enabling translational accelerations to generate rotational moments about said rotational axis, said center of buoyancy being positioned a first predetermined distance from said rotational axis and a second predetermined distance from said center of mass to provide first order compensation for temperature induced variations in the operation of said accelerometer;
a flotation fluid positioned within said case for supporting said pendulum element in substantially neutral buoyancy;
a pair of jewel-and-pivot bearings for rotatably mounting said pendulum element with said case, said bearings defining said rotational axis of said pendulum element;
a bellows unit positioned at one end of said cylindrical pendulum element and set within the wall of said outer case for providing compensation for flotation fluid volume expansion occurring with temperature variations of said fluid;
an angular motion sensor mounted within said case contiguous with and within a first end of said open ended cylindrical pendulum element and responsive to rotational movement of said pendulum element about said rotational axis for producing a signal proportional to the rotation of said pendulum element; and
a torquer element mounted within said case contiguous with and within a second end of said open ended pendulum element and responsive to said signal for generating a torque on said cylindrical pendulum element tending to maintain said pendulum element in a predetermined null position.

8. The combination defined in claim 7 wherein said first predetermined distance is substantially equal to $\alpha/\gamma (l_1+l_2)$ where $\gamma$ is the volume coefficient of expansion of the flotation fluid, $\alpha$ is the coefficient of variation of the magnetic field strength of the torquer magnets with temperature, and $(l_1+l_2)$ is said second predetermined distance.

9. A precision, temperature compensated, torque balance, pendulous accelerometer responsive to translational accelerations applied thereto for producing a signal proportional to the applied accelerations regardless of ambient temperature, said accelerometer comprising:

an outer case;
a cylindrical pendulum element rotatable in response to the applied acceleration and mounted within said case, said pendulum element including an open ended cylindrical shell with a buoyant chamber therein, a longitudinal axis of symmetry, a rotation axis parallel to the longitudinal axis and offset therefrom, a center of buoyancy displaced a first predetermined distance from the rotational axis, and a center of mass displaced a second predetermined distance from the rotational axis;
a pair of jewel-and-pivot bearings rotatably coupling said pendulum element to said case, said bearings defining the rotational axis;
a flotation fluid filling said case and contributing to the support of said pendulum element by buoyant forces, said fluid density being substantially dependent on temperature to alter the magnitude of buoyant force exerted on said pendulum element;
an angular motion sensor positioned adjacent said pendulum element and responsive to the rotation of said pendulum element for generating a signal proportional thereto;
a torquer element including a plurality of four torquing coils and a torquer magnet, said torquer magnet being positioned within one open end of said pendulum element and producing a magnetic field whose strength increases or decreases substantially with temperature decreases or increases, respectively, to provide first order compensation for temperature induced changes in buoyant force exerted on said pendulum element, said torquer element further including a temperature insensitive resistor connected in parallel with said four torquing coils to provide second order compensation for changes in the magnetic field strength of said torquer magnet, said torquer element being contiguously mounted with said pendulum element and being responsive to said signal for producing a counter-torque on said pendulum element opposing the rotation of said pendulum and tending to maintain said pendulum in a substantially null position.

10. The combination defined in claim 9 wherein the first predetermined distance is substantially equal to $$\alpha/\gamma(l_1+l_2),$$

where $\gamma$ is the volume coefficient of expansion of the flotation fluid, $\alpha$ is the coefficient of variation of the magnetific field strength of the torquer magnet with temperature, and $(l_1+l_2)$ defines the second predetermined distance, for providing that the changes in scale factor due to temperature induced variations in said flotation fluid are substantially compensated by equal and opposite changes in scale factor caused by temperature induced variations in said torquer magnetic field strength.

11. The combination defined in claim 10 wherein the value of said temperature insensitive resistor is defined by the expression, $R_0 (b/a-1)$, where $R_0$ is the total resistance of said four torquing coils at a predetermined temperature, $b$ is the temperature coefficient of resistance of said coils, and $a$ is the temperature coefficient of the accelerometer.

References Cited by the Examiner
UNITED STATES PATENTS

| | | | |
|---|---|---|---|
| 2,752,791 | 7/56 | Jarosh et al. | 73—504 X |
| 2,802,956 | 8/57 | Jarosh | 73—516 |
| 2,853,287 | 9/58 | Draper | 73—516 |
| 3,078,721 | 2/63 | Sawyer | 73—497 |

RICHARD C. QUEISSER, *Primary Examiner*.

ISAAC LISANN, *Examiner*.